US012326680B2

(12) United States Patent
Amita

(10) Patent No.: US 12,326,680 B2
(45) Date of Patent: Jun. 10, 2025

(54) FIXING DEVICE AND IMAGE FORMING APPARATUS INCORPORATING THE SAME

(71) Applicant: Akiyasu Amita, Kanagawa (JP)

(72) Inventor: Akiyasu Amita, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/383,905

(22) Filed: Oct. 26, 2023

(65) Prior Publication Data

US 2024/0142903 A1 May 2, 2024

(30) Foreign Application Priority Data

Oct. 31, 2022 (JP) ................................ 2022-174905

(51) Int. Cl.
*G03G 15/20* (2006.01)

(52) U.S. Cl.
CPC ................................ *G03G 15/2053* (2013.01)

(58) Field of Classification Search
CPC ........... G03G 15/2017; G03G 15/2053; G03G 2215/2003; G03G 2215/2035; G03G 2215/2038
See application file for complete search history.

(56) References Cited

U.S. PATENT DOCUMENTS

| | | | | |
|---|---|---|---|---|
| 5,162,634 | A | 11/1992 | Kusaka et al. | |
| 2011/0064494 | A1 | 3/2011 | Amita et al. | |
| 2012/0328343 | A1 | 12/2012 | Kunii et al. | |
| 2014/0369726 | A1* | 12/2014 | Soeda | G03G 15/2053 399/329 |
| 2017/0003633 | A1 | 1/2017 | Hase et al. | |
| 2017/0097598 | A1 | 4/2017 | Kudo et al. | |
| 2017/0131664 | A1 | 5/2017 | Utsunomiya et al. | |
| 2019/0137916 | A1* | 5/2019 | Sonoyama | G03G 15/2053 |
| 2019/0324391 | A1* | 10/2019 | Matsuo | G03G 15/2053 |
| 2020/0233354 | A1* | 7/2020 | Tatezawa | G03G 15/2064 |

FOREIGN PATENT DOCUMENTS

| | | | |
|---|---|---|---|
| EP | 2 816 421 | A2 | 12/2014 |
| JP | 2016-090683 | A | 5/2016 |
| JP | 2020-003636 | A | 1/2020 |
| JP | 2020190702 | A * | 11/2020 |
| JP | 2021-167863 | A | 10/2021 |

OTHER PUBLICATIONS

JP 2020190702 English machine translation, Yoshinaga et al., Nov. 26, 2020 (Year: 2020).*
Extended European Search Report issued Mar. 22, 2024 in European Patent Application No. 23203741.6, 7 pages.

* cited by examiner

*Primary Examiner* — Thomas S Giampaolo, II
(74) *Attorney, Agent, or Firm* — XSENSUS LLP

(57) ABSTRACT

A fixing device includes a belt forming a loop, a roller supporting an inner face of the belt, a pad, a slider, and a pressure rotator. The pad is inside the loop of the belt to press the inner face of the belt outward the belt. The slider is disposed between the belt and the pad to reduce friction between the belt and the pad. The pressure rotator presses the pad via the belt and the slider to form a fixing nip in which the belt and a recording medium are nipped between the pressure rotator and the slider to convey the belt and a recording medium in a conveyance direction. The pad has a recessed portion upstream from the fixing nip in the conveyance direction and extends in a longitudinal direction of the pad orthogonal to the conveyance direction.

5 Claims, 7 Drawing Sheets

COMPARATIVE EXAMPLE

COMPARATIVE EXAMPLE

COMPARATIVE EXAMPLE

COMPARATIVE EXAMPLE

FIXING DEVICE AND IMAGE FORMING APPARATUS INCORPORATING THE SAME

CROSS-REFERENCE TO RELATED APPLICATION

This patent application is based on and claims priority pursuant to 35 U.S.C. § 119(a) to Japanese Patent Application No. 2022-174905, filed on Oct. 31, 2022, in the Japan Patent Office, the entire disclosure of which is hereby incorporated by reference herein.

BACKGROUND

Technical Field

Embodiments of the present disclosure generally relate to a fixing device and an image forming apparatus incorporating the fixing device.

Related Art

An electrophotographic image forming apparatus includes a fixing device. The fixing device includes a fixing rotator and a pressure rotator contacting the fixing rotator to form a fixing nip. A recording medium to which a toner image is transferred passes through the fixing nip, and heat and pressure in the fixing nip fix the toner image onto the recording medium.

One type of fixing device includes a pressing member disposed on one of the fixing rotator and the pressure rotator and an elastic member disposed on the other one. The pressing member presses against the elastic member to elastically deform the elastic member to form the fixing nip

SUMMARY

This specification describes an improved fixing device that includes a belt, a roller, a pad, a slider, and a pressure rotator. The belt forms a loop. The roller supports an inner face of the belt. The pad is inside the loop of the belt to press the belt outward the belt. The slider is between the belt and the pad to reduce friction between the belt and the pad. The pressure rotator presses the pad via the belt and the slider to form a fixing nip in which the belt and a recording medium are nipped between the pressure rotator and the slider to convey the belt and a recording medium in a conveyance direction. The pad has a recessed portion upstream from the fixing nip in the conveyance direction. The recessed portion extends in a longitudinal direction of the pad orthogonal to the conveyance direction.

This specification also describes an image forming apparatus including the fixing device.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
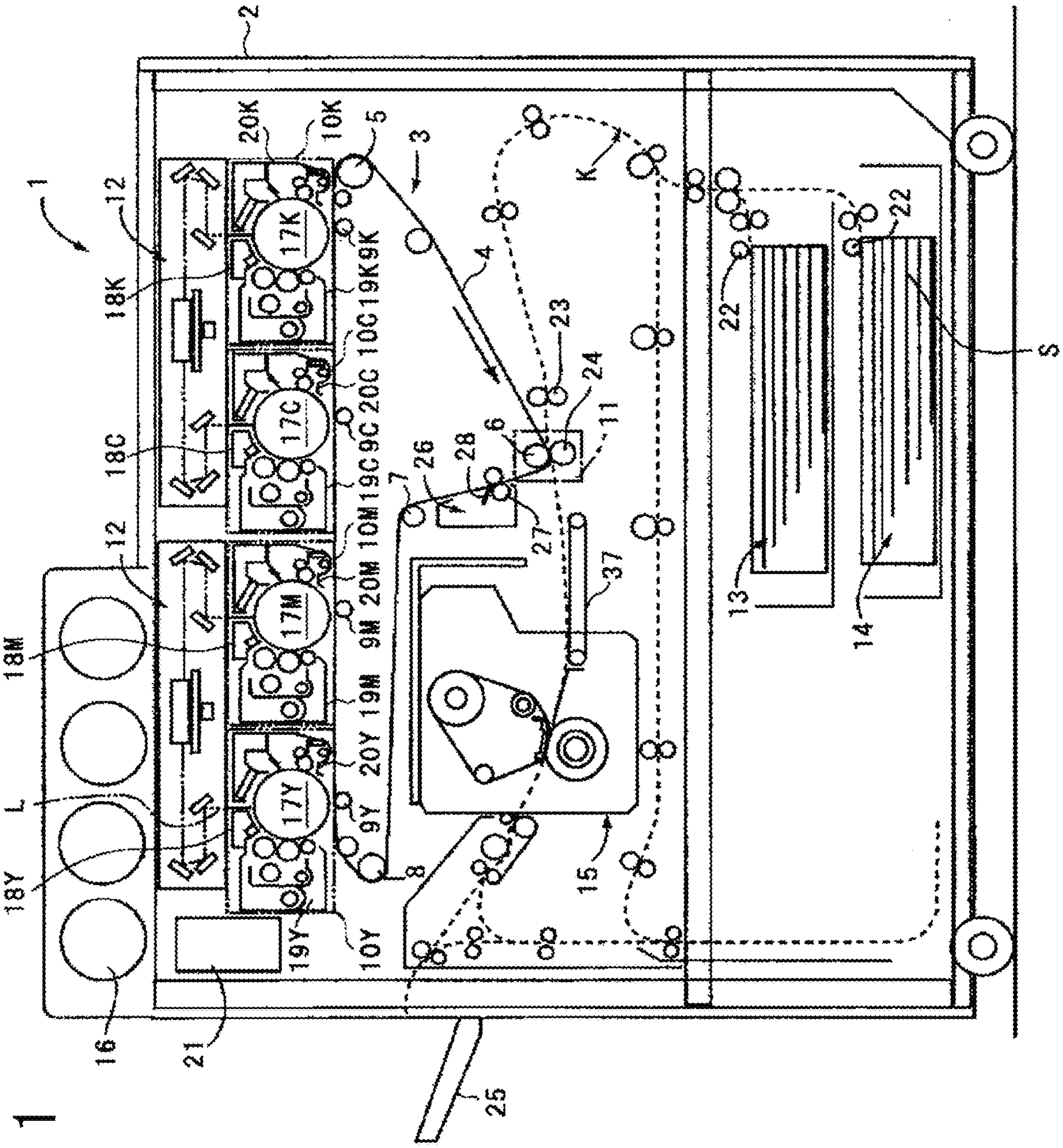
FIG. 1 is a schematic cross-sectional view of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a,” “an,” and “the” are intended to include the plural forms as well, unless the context clearly indicates otherwise.

With reference to drawings, descriptions are given below of embodiments of the present disclosure. In the drawings illustrating embodiments of the present disclosure, elements or components having identical or similar functions or shapes are given similar reference numerals as far as distinguishable, and redundant descriptions are omitted.

FIG. 1 is a schematic cross-sectional view of an image forming apparatus 1 including a fixing device according to an embodiment of the present disclosure.

In FIG. 1, the image forming apparatus 1 is a printer and includes an intermediate transfer unit 3 substantially at the center of an apparatus main body 2. The intermediate transfer unit 3 includes an intermediate transfer belt 4 as an intermediate transferor, and the intermediate transfer belt 4 is stretched in a loop shape by a plurality of support rollers. The support rollers include a drive roller 5 that rotates the intermediate transfer belt 4 clockwise in FIG. 1, a secondary transfer backup roller 6, driven rollers 7 and 8, and four primary transfer rollers 9Y. 9M, 9C, and 9K.

The intermediate transfer belt 4 is stretched in a posture like a substantially inverse triangle. Above an upper surface of the stretched intermediate transfer belt 4 that is the upper side of the inverse triangle, four process cartridges 10Y, 10M, 1C, and 10K are arranged side by side in the horizontal direction. The process cartridges 10Y, 10M, 10C, and 10K correspond to yellow, magenta, cyan, and black, respectively.

The process cartridge 10Y includes parts to form a yellow toner image, and the formed yellow toner image is transferred onto the intermediate transfer belt 4. Similarly, the process cartridge 10M includes parts to form a magenta toner image, the process cartridge 10C includes parts to form a cyan toner image, and the process cartridge 10K includes parts to form a black toner image.

The magenta, cyan, and black toner images are transferred from the process cartridges 10M, 10C, and 10K to the intermediate transfer belt 4 at primary transfer positions at which the process cartridges 10M, 10C, and 10K face the primary transfer rollers 9M, 9C, and 9K, respectively. The intermediate transfer belt 4 rotates, and the color toner image primarily transferred onto the intermediate transfer belt 4 reaches the secondary transfer portion 11.

In FIG. 1, above the process cartridges 10Y, 10M, 10C, and 10K, a pair of exposure units 12 are disposed, one of the pair of the exposure units irradiates photoconductor drums 17Y and 17M with exposure lights L based on yellow image data and magenta image data, and the other one irradiates photoconductor drums 17C and 17K with exposure lights L based on cyan image data and black image data. The pair of exposure units 12 includes a laser controller that receives image data of each color based on image data of a document transmitted from a scanner to a controller 21 and semiconductor lasers that emit four exposure light beams L. The exposure light beams L scan photoconductor drums 17Y, 17M, 17C, and 17K in the process cartridges 10Y, 10M, 10C, and 10K and write electrostatic latent images of yellow, magenta, cyan, and black on the surfaces of the photoconductor drums 17Y, 17M, 17C, and 17K, respectively.

As illustrated in FIG. 1, the image forming apparatus 1 includes sheet trays 13 and 14 accommodating sheets S as recording media, a fixing device 15 in which heat and pressure fix an unfixed toner image transferred onto the sheet S, and toner bottles 16 each accommodating toner therein.

The following describes the process cartridges 10Y. 10M, 10C, and 10K. Since the process cartridges 10Y, 10M, 10C, and 10K have the same configuration except for the color of toner to be used, the process cartridge 10Y is described as a representative.

The process cartridge 10Y includes the photoconductor drum 17Y as an image bearer disposed substantially at the center of the process cartridge 10Y and, around the photoconductor drum 17Y, includes a charging device 18Y to charge the photoconductor drum 17Y and a developing device 19Y to develop the electrostatic latent image formed on the surface of the photoconductor drum 17Y.

In addition, the process cartridge 10Y includes, around the photoconductor drum 17Y, a photoconductor cleaner 20Y to collect untransferred toner remaining on the surface of the photoconductor drum 17Y and a discharger to remove electric charge on the photoconductor drum 17Y The process cartridge 10Y includes a casing as a common support member supporting the above-described parts and is configured to be integrally attachable to and detachable from the apparatus main body 2 as a single unit to enhance maintainability.

Image forming operations of the image forming apparatus 1 are described below. First, the scanner transmits image data to the controller 21 including a microcomputer and being disposed inside the apparatus main body 2, and the controller 21 decomposes the received image data into four color image data of yellow, magenta, cyan, and black. For example, the controller 21 converts yellow image data into electrical signals and transmits the electrical signals to the exposure unit 12. The exposure unit 12 irradiates the photoconductor drum 17Y with the exposure light L such as laser light based on the yellow image data, i.e., the electrical signals transmitted from the controller 21.

The photoconductor drums 17Y, 17M, 17C, and 17K rotate counterclockwise in FIG. 1. The charging devices 18Y, 18M, 18C, and 18K uniformly charge surfaces of the photoconductor drums 17Y, 17M, 17C, and 17K. Irradiating the charged surface of the photoconductor drum 17Y with the exposure light L forms an electrostatic latent image corresponding to the yellow image data. Similarly, electrostatic latent images are formed on the surfaces of the photoconductor drums 17M, 17C, and 17K. The rotation of the photoconductor drum 17Y conveys the formed electrostatic latent image to a portion in which the photoconductor drum 17Y faces the developing device 19Y, and the developing device 19Y visualizes the electrostatic latent image. Similarly, the developing devices 19M, 19C, and 19K visualize the electrostatic latent images.

The yellow, magenta, cyan, and black toners are stored in the toner bottles 16 and are supplied to the developing devices 19Y, 19M, 19C, and 19K, respectively. A stirrer in the developing device stirs and mixes the toner and carrier. Stirring the toner with the carrier triboelectrically charges the toner. Developer including the charged toner and the carrier is supplied to the developing roller. The developing roller rotates, and the developer borne on the developing roller passes through the gap between a doctor blade and the developing roller to have a uniform layer thickness. Subsequently, the developer on the developing roller comes into contact with the photoconductor drum, and the toner adheres to the electrostatic latent image on the photoconductor drum. As a result, the toner images are formed on the photoconductor drums 17Y, 17M, 17C, and 17K. The controller 21 controls the exposure units 12 and the devices in the process cartridges 10Y, 10M, 10C, and 10K to periodically form toner patterns on the photoconductor drums 17Y, 17M, 17C, and 17K. Reflection density sensors that are optical sensors detect image densities of the toner patterns on the photoconductor drums 17Y, 17M, 17C, and 17K. Based on the densities detected by the reflection density sensors, the controller 21 controls toner supply to the developing devices 19Y, 19M, 19C, and 19K.

The toner images developed by the developing devices 19Y, 19M, 19C, and 19K and formed on the surfaces of the photoconductor drums 17Y, 17M, 17C, and 17K are primarily transferred onto the intermediate transfer belt 4 at portions at which the photoconductor drums 17Y, 17M, 17C, and 17K face the primary transfer rollers 9. After the primary transfer step, a small amount of untransferred toner that has not been transferred to the intermediate transfer belt 4 remains on the surface of each of the photoconductor drums 17Y, 17M, 17C, and 17K. The photoconductor cleaners 20Y, 20M, 20C, and 20K each include a brush, a roller, or a blade and each remove the untransferred toner on each of the photoconductor drums 17Y, 17M, 17C, and 17K. Subsequently, a discharger in each of the process cartridges removes electric charge on the photoconductor drum and enables starting a next image forming process.

Primarily transferring yellow, magenta, cyan, and black toner images from the process cartridges 10Y, 10M, 10C, and 10K to the intermediate transfer belt 4 and superimposing the toner images on the intermediate transfer belt 4 form a full-color toner image on the intermediate transfer belt 4. The intermediate transfer belt 4 rotates, and the full-color toner image reaches the secondary transfer portion 11. At the same time, one of the sheet trays 13 and 14 is automatically or manually selected. For example, if the sheet tray 13 is selected, a feed roller 22 disposed on the sheet tray 13 rotates to feed one of the sheets S stored in the sheet tray 13 to a conveyance passage K, and the sheet S passes through the conveyance passage K and reaches a registration roller pair 23.

The registration roller pair 23 rotates to convey the sheet S to the secondary transfer portion 11, timed to coincide with the arrival of the full-color toner image on the intermediate transfer belt 4.

A secondary transfer roller 24 in the secondary transfer portion 11 is pressed against the secondary transfer backup roller 6 and contacts the intermediate transfer belt 4 to form a secondary transfer nip, the full-color toner image is transferred from the intermediate transfer belt 4 onto the sheet S in the secondary transfer nip. A conveyor 37 conveys the sheet S to which the full-color toner image is transferred to a fixing device 15, and heat and pressure fixe the full-color toner image onto the sheet in the fixing device 15. After the full-color toner image is fixed onto the sheet S, the full-color toner image on the sheet S as an output image is ejected onto an output tray 25.

After passing through the secondary transfer portion 11, the intermediate transfer belt 4 reaches a belt cleaner 26 disposed downstream from the secondary transfer portion 11 in a rotation direction of the intermediate transfer belt 4. The belt cleaner 26 includes a cleaning brush 27 and a cleaning blade 28 and removes residual toner on the intermediate transfer belt 4. Thus, a series of the image forming processes is completed.

Figure 2:
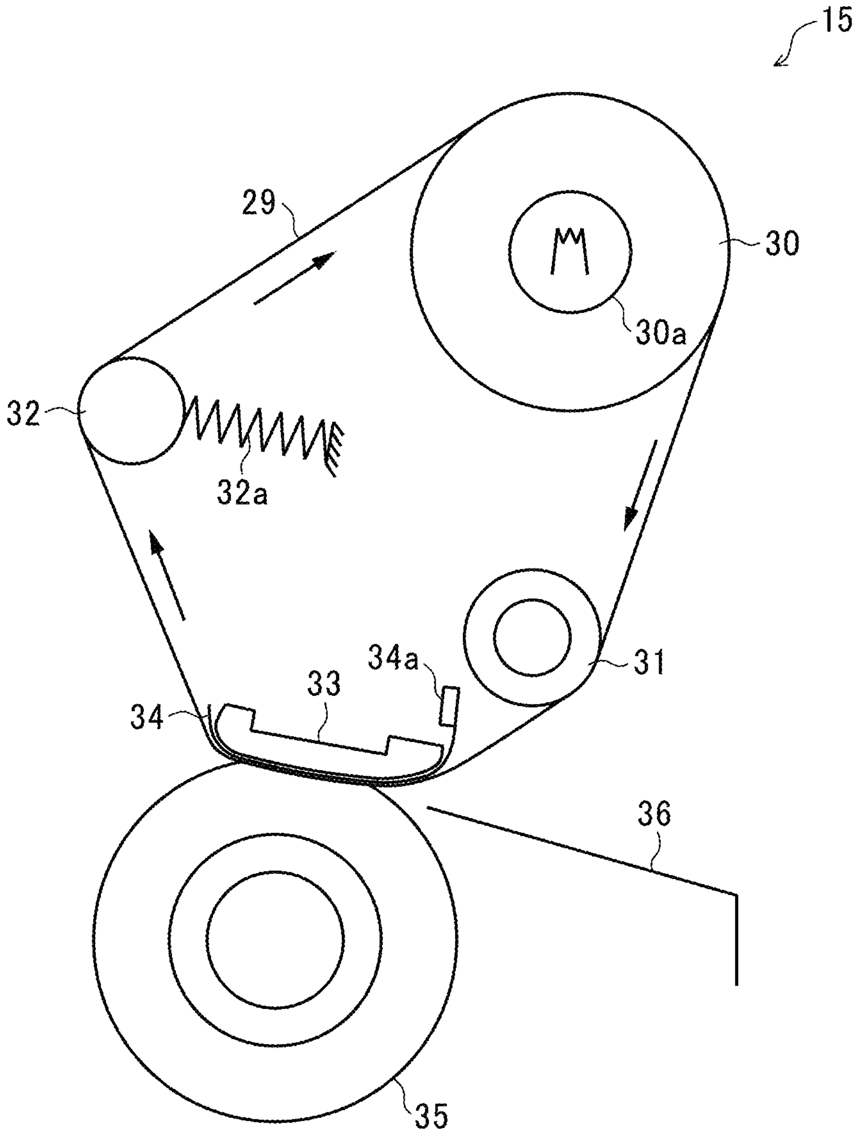
FIG. 2 is a schematic view of a fixing device according to a comparative example.
Figure 3:
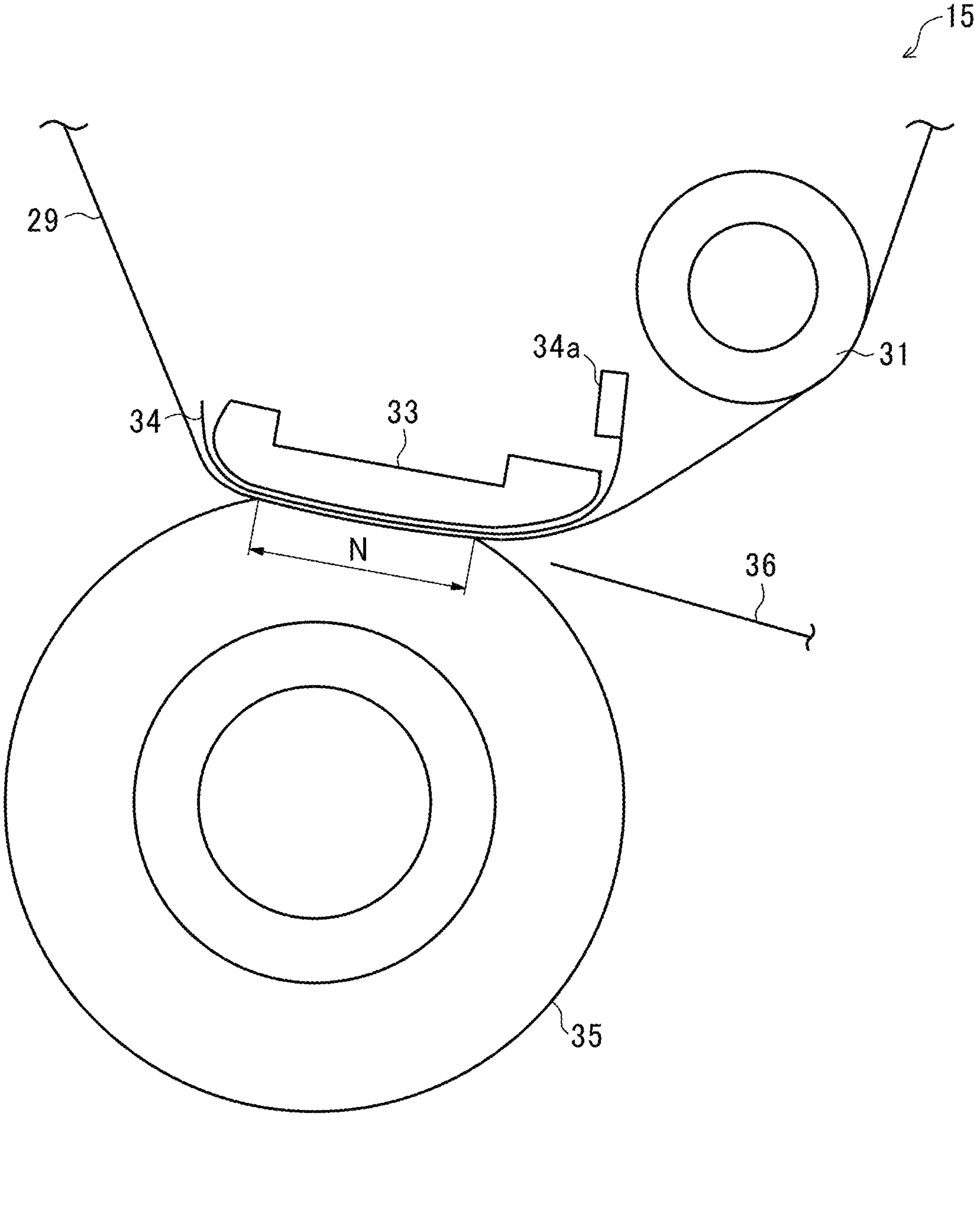
FIG. 3 is an enlarged view of a portion of FIG. 2 to illustrate the fixing device according to the comparative example.

The following describes the fixing device 15 according to a comparative example. FIG. 2 is a schematic view of the fixing device 15, and FIG. 3 is an enlarged view of a portion of FIG. 2.

In FIG. 2, the fixing device 15 includes a fixing belt 29 as a belt that is an endless belt, a heating roller 30 as a heating rotator, a support roller 31 as a support, and a tension roller 32 as the support. The fixing device 15 further includes a sliding pad 33 as a pressing member, a sliding sheet 34 as a slider, a pressure roller 35 as a pressure rotator, and a guide 36. Each of the widths of the fixing belt 29, the sliding pad 33, the sliding sheet 34, and the pressure roller 35 in a width direction of the sheet S orthogonal to the sheet conveyance direction is set to be larger than the largest width of the widths of the sheets S on which the image forming apparatus 1 can form the image.

The fixing belt 29 is an endless belt having a multilayer structure, such as a two-layered belt including a base and a release layer or a three-layered belt including the base, an elastic layer, and the release layer. The surface of the fixing belt 29 including the elastic layer easily adheres to the toner image and enhances the image quality.

The heating roller 30 includes a heater 30*a* inside the heating roller 30, the heater 30*a* heats the heating roller 30, and the heating roller 30 heats the fixing belt 29. The fixing device 15 includes a temperature sensor to detect temperature of the surface of the fixing belt 29 in contact with the heating roller 30. Based on results detected by the temperature sensor, the controller 21 controls power supplied to the heater 30*a*. The heating roller 30 is rotatably supported by a frame of the fixing device 15 and is driven to rotate by rotation of the fixing belt 29.

The support roller 31 around which the fixing belt 29 is stretched is rotatably supported by the frame of the fixing device 15 and is driven to rotate by the rotation of the fixing belt 29 that is rotated in a direction indicated by arrows in FIG. 2.

The tension roller 32 around which the fixing belt 29 is stretched is rotatably supported by a support plate that is movably supported by the frame of the fixing device 15. A compression spring 32*a* that urges the tension roller 32 leftward in FIG. 2 is attached to the support plate, and the tension roller 32 applies a predetermined tensile force to the fixing belt 29.

The sliding pad 33 is fixed on a stay, and the stay is fixed on the frame of the fixing device 15. As a result, the position of the sliding pad 33 does not change even when the pressure roller 35 presses the sliding pad 33, which enables forming a uniform width of the fixing nip. Controlling the force pressing the pressure roller 35 enables controlling the width of the fixing nip.

The sliding pad 33 has a nip formation surface along the sheet conveyance direction of the sheet S. To reduce the sliding friction between the sliding pad 33 and the fixing belt 29, a fluororesin layer is disposed on the nip formation surface. The sliding pad 33 has curves at both ends of the nip formation surface. The nip formation surface in the present embodiment has a curved surface but may have a flat surface. The curved surface of the sliding pad 33 is designed so as not to interfere with the conveyance of the sheet S.

The sliding pad 33 is preferably made of a heat-resistant material. This prevents thermal deformation of the sliding pad 33 at temperatures in a fixing temperature range desirable to fix the toner image on the sheet S, retains the fixing nip stably, and stabilizes output image quality.

Examples of the heat-resistant material of the sliding pad 33 include general heat-resistant resin such as polyether sulfone (PES), polyphenylene sulfide (PPS), liquid crystal polymer (LCP), polyether nitrile (PEN), polyamide imide (PAI), and polyether ether ketone (PEEK).

The sliding sheet 34 is disposed between the sliding pad 33 and the fixing belt 29 in order to reduce the sliding friction between the sliding pad 33 and the fixing belt 29. One end of the sliding sheet 34 is fixed to an attachment portion 34*a* fixed to the frame of the fixing device 15. The sliding sheet 34 is made of, for example, a fluorine layer sheet or a sheet made of glass fiber that is impregnated with fluorine resin.

The pressure roller 35 is disposed outside the fixing belt 29 and faces the fixing belt 29 on the sliding pad 33. A contact-and-separation mechanism moves the pressure roller 35 to press against or separate from the fixing belt 29 on the sliding pad 33. The pressure roller 35 functions as an elastic body and includes an elastic layer made of, for example, silicon rubber, and the elastic layer forms an outer peripheral surface of the pressure roller 35. The pressure roller 35 presses the sliding pad 33 via the fixing belt 29 and elastically deforms to form the fixing nip N illustrated in FIG. 3. A driver such as a motor is attached to the frame of the fixing device 15 and drives and rotates the pressure roller 35. When the contact-and-separation mechanism presses the pressure roller 35 against the sliding pad 33, the rotation of the pressure roller 35 rotates the fixing belt 29 in the direction indicated by the arrows in FIG. 2.

The guide 36 includes a plate fixed on the frame of the fixing device 15 and guides the sheet S conveyed by the conveyor 37 toward the fixing nip N.

The pressure roller 35 is driven to rotate and brought into pressure contact with the sliding pad 33, which rotates the fixing belt 29. The rotation of the fixing belt 29 rotates the heating roller 30. The conveyor 37 conveys the sheet S to the fixing device 15, and the guide 36 guides the sheet S to the fixing nip N. The rotation of the pressure roller 35 conveys the sheet S in the fixing nip N. Heat is transmitted from the heater 30*a* to the sheet S via the heating roller 30 and the fixing belt 29 to melt the toner transferred on the sheet S. and pressure applied by the pressure roller 35 in addition to the heat fixes the toner image onto the sheet S.

The fixing nip N is defined as a region in which the pressure roller 30 is in contact with the fixing belt 25. An upstream end of the fixing nip N in the sheet conveyance direction is referred to as an entrance of the fixing nip. To examine a real fixing nip in the image forming apparatus, for example, the following methods are used. Exchanging the sliding sheet 34 for a thermochromic sheet such as an overhead projector transparency (OHP sheet) and driving the fixing device for a short time (e.g., five minutes) discolors the thermochromic sheet. Examining the discolored area in the thermochromic sheet can specify the area of the fixing nip N and the position of the entrance of the fixing nip. Alternatively, measuring the center position of rotation of the pressure roller, the diameter of the pressure roller, and the position of the sliding pad can specify the area of the fixing nip N and the position of the entrance of the fixing nip.

Figure 4:
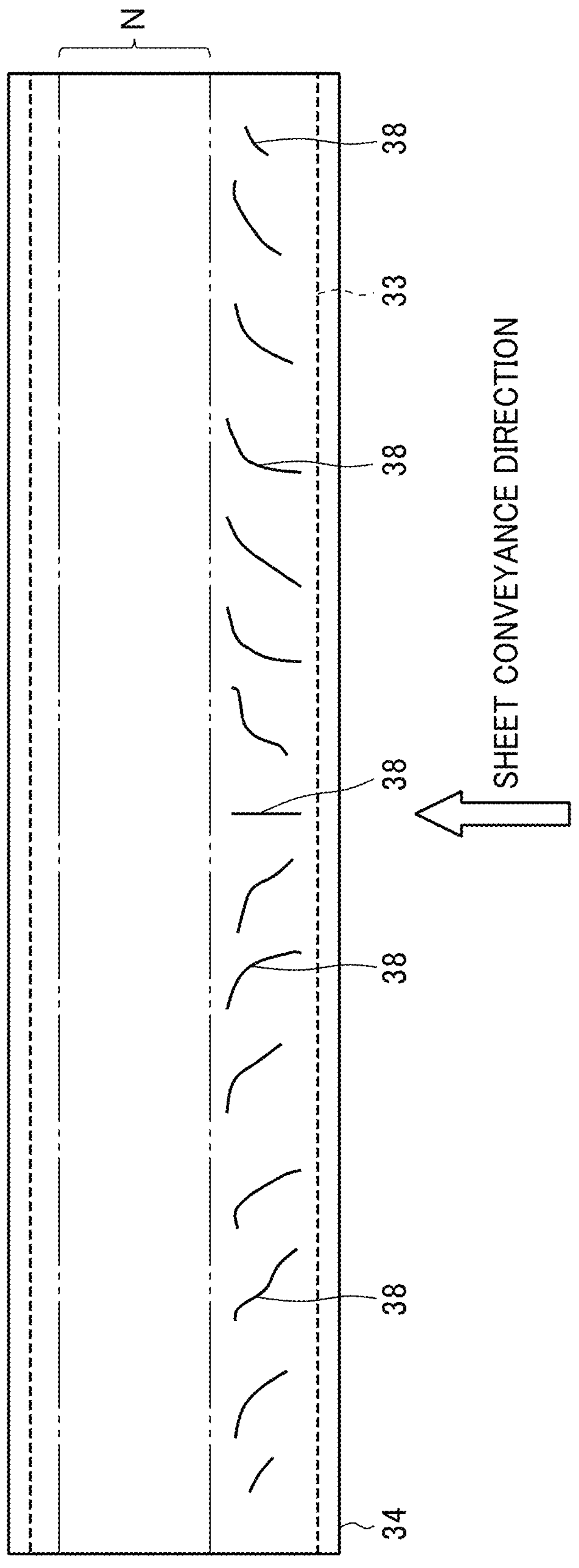
FIG. 4 is a schematic view of a sliding sheet to illustrate deformed portions caused in the sliding sheet of the fixing device according to the comparative example.

In the above-described configuration, the sliding sheet 34 may be deformed into a wavy shape by influence of a load due to heating, a load due to pressing, and thermal shrinkage during a fixing process after the fixing device is used fora long time. The above-described deformation of the sliding sheet 34 does not occur at the fixing nip N because the pressure roller 35 presses the sliding sheet 34. The above-described deformation of the sliding sheet 34 hardly occurs in a portion of the sliding sheet 34 downstream from the fixing nip N in the sheet conveyance direction because the portion of the sliding sheet 34 in contact with the nip formation surface of the sliding pad 33 is short. The above-described deformation of the sliding sheet 34 occurs in a portion of the sliding sheet 34 upstream from the fixing nip N in the sheet conveyance direction because a long portion of the sliding sheet 34 upstream from the fixing nip N is in contact with the nip formation surface of the sliding pad 33. As illustrated in FIG. 4, the above-described deformation of the sliding sheet 34 causes multiple deformed portions 38, which are wavy irregularities, in the portion upstream the fixing nip N in the sheet conveyance direction.

Figure 5:
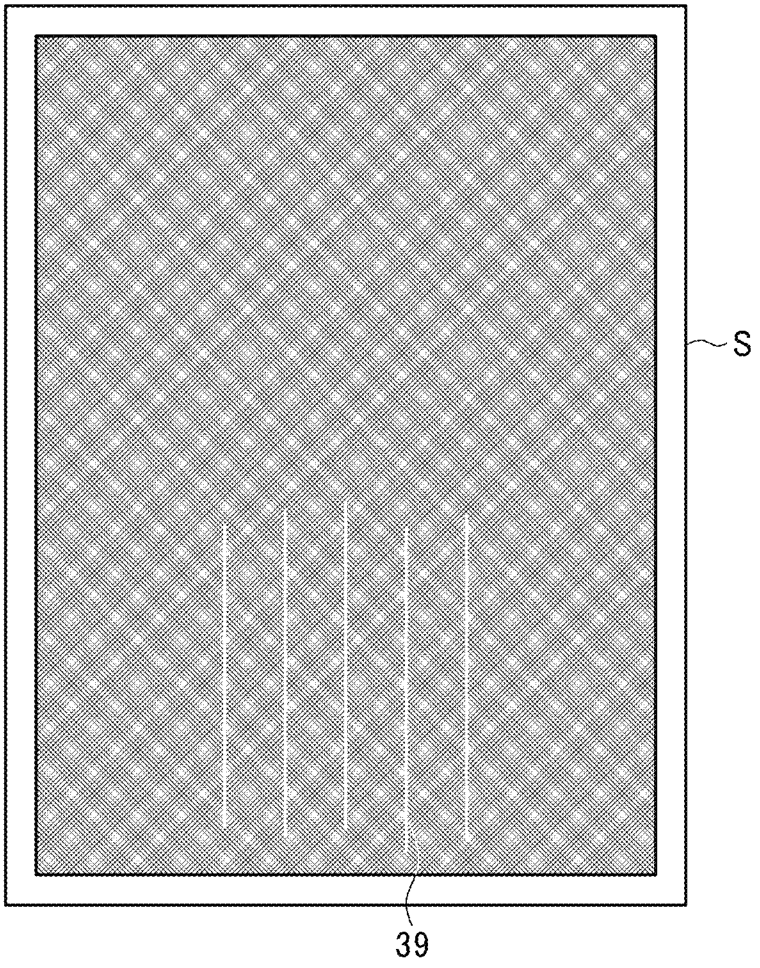
FIG. 5 is a schematic view of an abnormal image caused by the fixing device according to the comparative example.

The deformed portions 38 formed in the sliding sheet 34 contact the fixing belt 29, and the wavy irregularities of the deformed portions 38 fluctuate the fixing belt in a wavy shape. Portions of the fixing belt 29 fluctuating in the wavy shape contact the sheet S bearing the unfixed toner image at the entrance of the fixing nip N, scratches the unfixed toner, and forms an abnormal image 39 having streaks as illustrated in FIG. 5. The sheet S has a slack at a portion upstream from the fixing nip N in the sheet conveyance direction, and a rear portion of the slack jumps and contacts the fixing belt 29.

The following describes a configuration of the present embodiment to prevent the occurrence of the above-described abnormal image.

Figure 6:
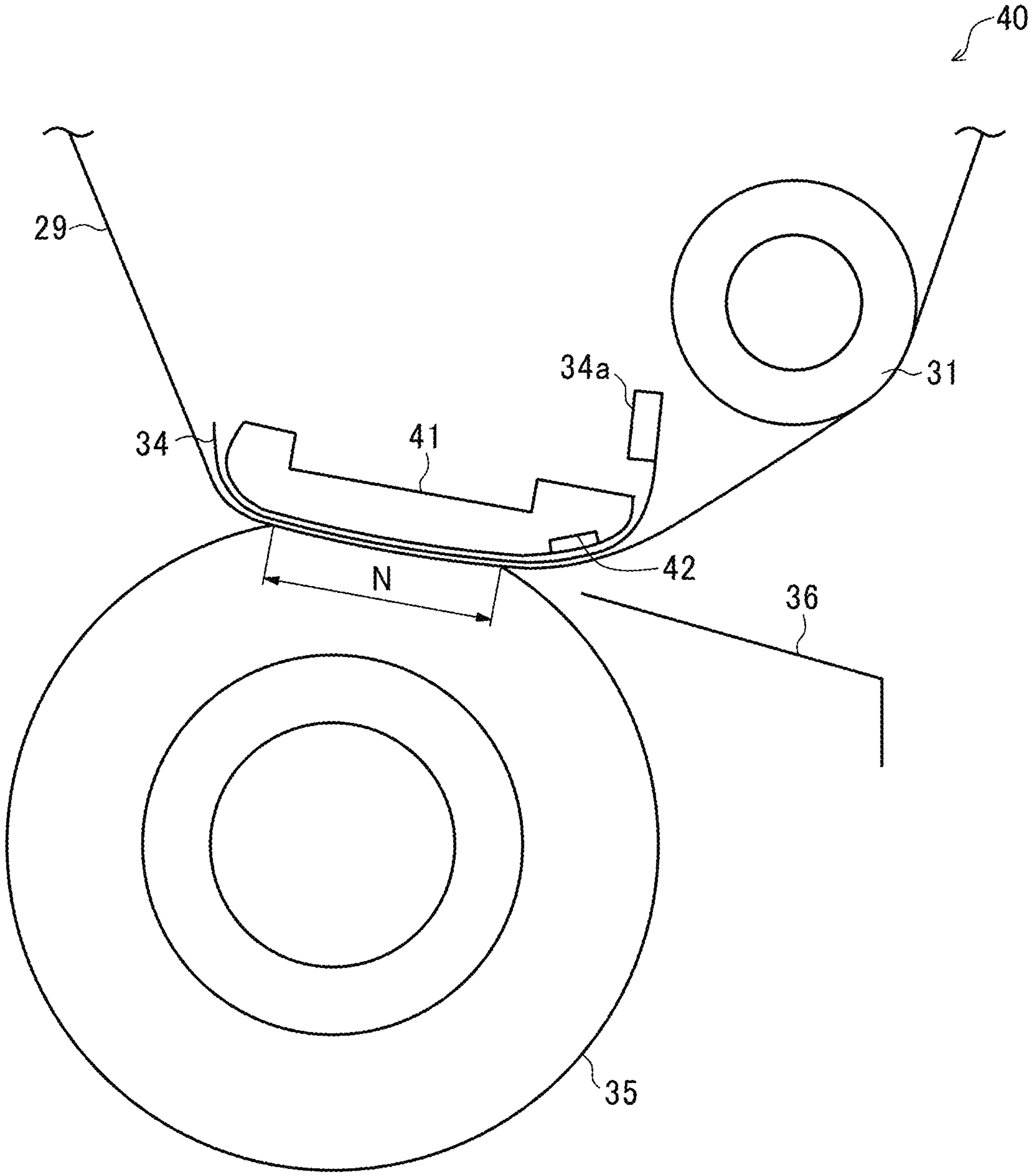
FIG. 6 is a partial view of a fixing device according to an embodiment of the present disclosure.

FIG. 6 is a partially enlarged view of a fixing device 40 according to an embodiment of the present disclosure. The difference between the fixing device 40 and the fixing device 15 according to the comparative example is a sliding pad 41 as the pressing member that is different from the sliding pad 33, and other parts are the same.

Figure 7:
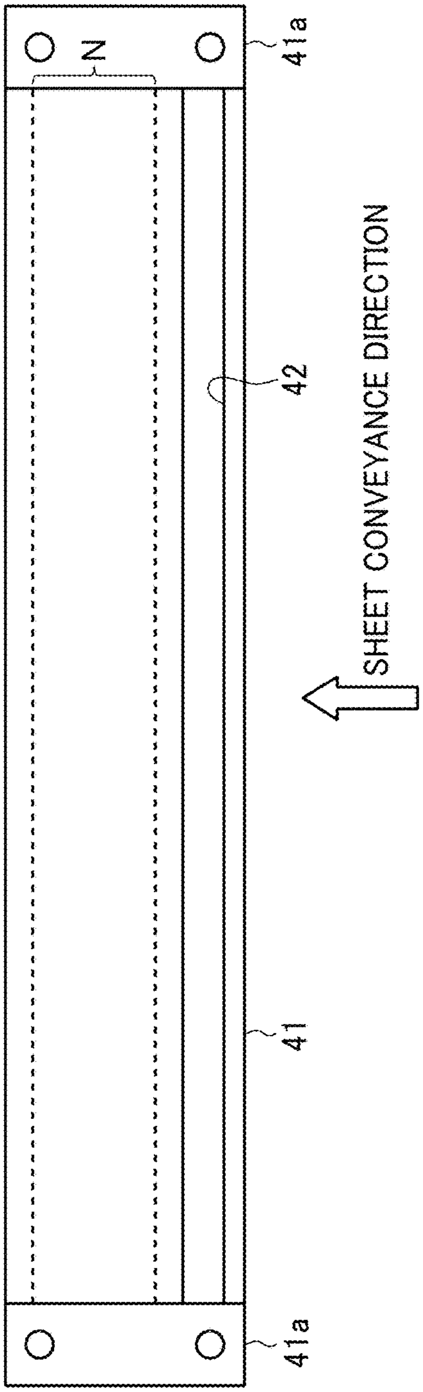
FIG. 7 is a schematic plan view of a sliding pad used in the fixing device of FIG. 6.

The sliding pad 41 has a recessed portion 42 that is the difference between the sliding pad 41 and the sliding pad 33. FIG. 7 is a schematic plan view of the sliding pad 41. As illustrated in FIGS. 6 and 7, the recessed portion 42 extends over the entire length of the fixing nip N in a longitudinal direction of the sliding pad 41 orthogonal to the sheet conveyance direction and is upstream from the fixing nip N in the nip formation surface of the sliding pad 41 in the sheet conveyance direction. The recessed portion 42 has a length longer than the largest width of the widths of the sheets S used in the image forming apparatus 1 in the direction orthogonal to the sheet conveyance direction to cover the sheet having the largest width. The sliding pad 41 has a contact surface contacting the sliding sheet 34, and the recessed portion 42 is recessed from the contact surface in a direction away from the sliding sheet 34. A width of the recessed portion 42 is smaller than a width of the fixing nip N in the sheet conveyance direction. The sliding pad 41 includes attachments 41*a* illustrated in FIG. 7 to attach the sliding pad 41 to the stay fixed on the frame of the fixing device 40. The attachments 41*a* are located outside a region of the sliding pad 41 on which the fixing belt 29 and the sheet S are conveyed, that is, outside the fixing nip N in the longitudinal direction of the sliding pad 41.

Figure 8:
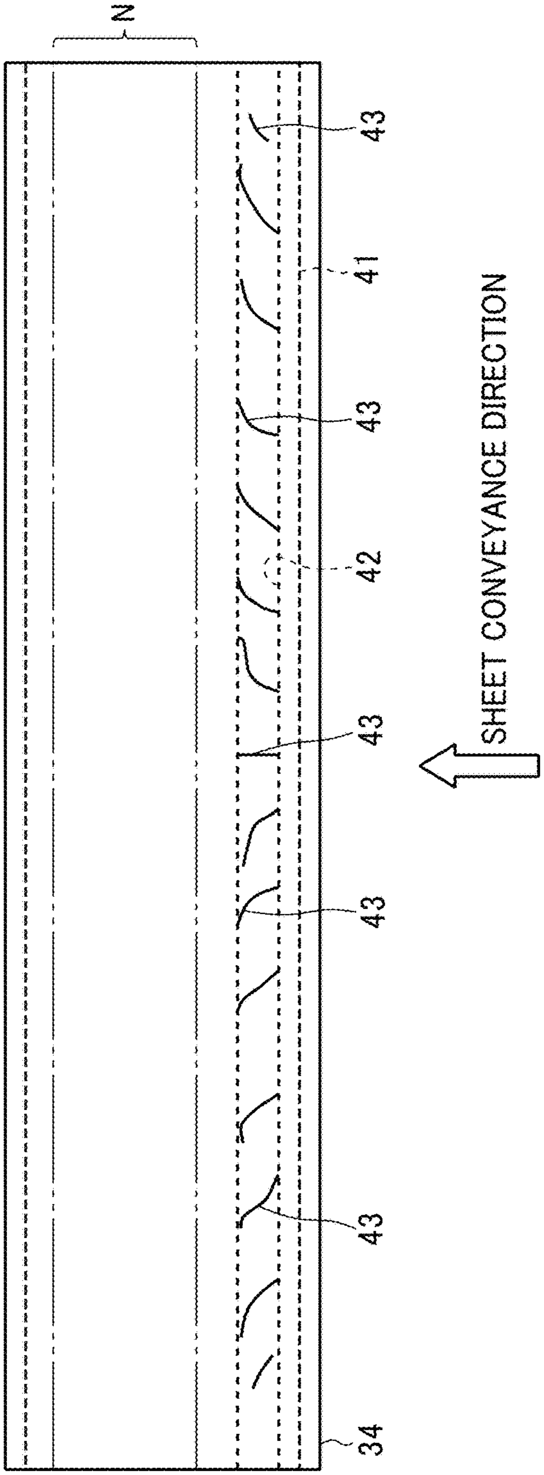
FIG. 8 is a schematic view of a sliding sheet used in the fixing device of FIG. 6, illustrating deformed portions caused in the sliding sheet.

Also, in the above-described configuration, the sliding sheet 34 forms deformed portions 43 that are wavy irregularities and similar to the deformed portions 38. Similar to the deformed portions 38, the deformed portions 43 do not occur at the fixing nip N and hardly occur in the portion downstream from the fixing nip N in the sheet conveyance direction but occur at multiple positions on the sliding sheet 34 and upstream from the fixing nip N in the sheet conveyance direction. However, the sliding pad 41 has the recessed portion 42 facing the deformed portions 43, and the deformed portions 43 enter the recessed portion 42 and are not formed in a portion other than the recessed portion 42 as illustrated in FIG. 8. Protrusions of the deformed portions 43 formed in the recessed portion 42 are in the recessed portion 42 and do not protrude from the nip formation surface of the sliding pad 41. The above-described configuration can prevent the deformed portions 43 of the sliding sheet 34 from fluctuating the fixing belt 29 in the wavy shape even when the fixing belt 29 contacts the sliding sheet 34 and avoid contact between the sheet S and the portion of the fixing belt 29 upstream from the fixing nip in the sheet conveyance direction. As a result, the above-described configuration can prevent the occurrence of the abnormal image.

In addition, the recessed portion 42 extending over the entire width of the sliding pad 41 in the above-described embodiment can prevent the occurrence of the abnormal image over the entire width of the sheet S on which the image is formed.

The recessed portion 42 is preferably as close as possible to the entrance of the fixing nip. However, the recessed portion 42 overlapping the fixing nip is not preferable. The recessed portion 42 overlapping the fixing nip deforms the pressure roller and applies an unnecessary load to the rotation of the pressure roller. Therefore, it is preferable that the distance from the entrance of the fixing nip to the downstream edge of the recessed portion 42 in the sheet conveyance direction is 0 mm or more. More preferably, the distance from the entrance of the fixing nip to the downstream edge of the recessed portion 42 in the sheet conveyance direction is 2 mm or more. The distance of 2 mm or more can absorb a variation of the fixing nip caused by various factors such as a variation in the hardness of the pressure roller.

On the other hand, when the recessed portion 42 is too far from the entrance of the fixing nip, the deformed portion 43 that occurs in the vicinity of the entrance of the fixing nip does not enter the recessed portion 42. As a result, the recessed portion 42 that is too far from the fixing nip 42 cannot prevent the occurrence of the abnormal image. The present inventor found that the recessed portion 42 positioned so that the distance from the entrance of the fixing nip to the downstream edge of the recessed portion 42 in the sheet conveyance direction is 10 mm or less improves the abnormal image. The present inventor found that the recessed portion 42 positioned so that the distance from the entrance of the fixing nip to the downstream edge of the recessed portion 42 in the sheet conveyance direction is 8 mm or less prevents the occurrence of the abnormal image.

The width of the recessed portion 42 in the sheet conveying direction is preferably as wide as possible as long as the structure of the nip formation pad allows. The present inventor found that the recessed portion 42 having a width of 3 mm or more improves the abnormal image. In addition, the recessed portion 42 having a width of 7 mm sufficiently prevents the occurrence of the abnormal image.

The depth of the recessed portion 42 is preferably as deep as possible as long as the strength of the nip formation pad can allow. The depth of the recessed portion 42 is defined as a distance from the position of the bottom surface of the recessed portion 42 farthest from the sliding sheet on nip formation pad to a straight line connecting the upstream edge and the downstream edge of the recessed portion 42 in the sheet conveyance direction. The present inventor found that the recessed portion 42 having a depth equal to or greater than the thickness of the sliding sheet prevents the occurrence of the abnormal image. Considering various factors, the present inventor found that a preferable design range of the depth of the recessed portion is from a thickness obtained by rounding up the last digit of the upper limit of the thickness tolerance of the sliding sheet to a thickness obtained by rounding down the last digit of three times the upper limit of the thickness tolerance of the sliding sheet. For example, in a fixing device using the sliding sheet having a depth of 0.21 f 0.03 mm, a preferable design range of the depth of the recessed portion is 0.3 mm to 0.8 mm.

In the above-described embodiment, the image forming apparatus 1 is the printer forming the full-color toner image as an example of the image forming apparatus according to the present embodiment, but the image forming apparatus is not limited to this. The present disclosure is also adoptable to a copier, a facsimile machine, and a multifunction peripheral (MFP).

In the above-described embodiment, the sheet S is mentioned as an example of the recording medium on which an image is formed and is not limited the standard paper but also includes thick paper, a postcard, a rolled sheet, an envelope, plain paper, thin paper, coated paper, art paper, tracing paper, an overhead projector transparency (OHP sheet or OHP film), a resin film, and any other sheet-shaped material on which an image can be formed.

Aspects of the present disclosure are, for example, as follows.

<First Aspect>

In a first aspect, a fixing device includes a belt, a roller, a pad, a slider, and a pressure rotator. The belt forms a loop. The roller supports an inner face of the belt. The pad is inside the loop of the belt to press the belt outward the belt. The slider is between the belt and the pad to reduce friction between the belt and the pad. The pressure rotator presses the pad via the belt and the slider to form a fixing nip in which the belt and a recording medium are nipped between the pressure rotator and the slider to convey the belt and a recording medium in a conveyance direction. The pad has a recessed portion upstream from the fixing nip in the conveyance direction. The recessed portion extends in a longitudinal direction of the pad orthogonal to the conveyance direction.

<Second Aspect>

In a second aspect, the recessed portion in the fixing device according to the first aspect extends over an entire length of the fixing nip in the longitudinal direction.

<Third Aspect>

In a third aspect, the pad in the fixing device according to the first aspect or the second aspect has a contact surface contacting the slider, and the recessed portion is recessed from the contact surface in a direction away from the slider.

<Fourth Aspect>

In a fourth aspect, the fixing device according to any one of the first to third aspects has a distance from an entrance of the fixing nip to a downstream edge of the recessed portion in the conveyance direction that is 0 mm or more and 10 mm or less, a width of the recessed portion in the conveyance direction that is 3 mm or more, and a depth of the recessed portion that is equal to or larger than a thickness of the slider.

<Fifth Aspect>

In a fifth aspect, the pad in the fixing device according to any one of the first to fourth aspects includes an attachment to fix the pad to the fixing device, and the attachment is outside the fixing nip in the longitudinal direction.

<Sixth Aspect>

In a sixth aspect, an image forming apparatus includes the fixing device according to any one of the first to fifth aspects.

The above-described embodiments are illustrative and do not limit the present disclosure. Thus, numerous additional modifications and variations are possible in light of the above teachings. For example, elements and/or features of the embodiment and variation may be combined with each other and/or substituted for each other within the scope of the present disclosure.

The advantages achieved by the embodiments described above are examples and therefore are not limited to those described above.

The invention claimed is:

1. A fixing device comprising:

a belt forming a loop;

a roller supporting an inner face of the belt;

a pad inside the loop of the belt to press the inner face of the belt outward the belt;

a slider between the belt and the pad to reduce friction between the belt and the pad; and a pressure rotator to press the pad via the belt and the slider to form a fixing nip in which the belt and a recording medium are nipped between the pressure rotator and the slider to convey the belt and a recording medium in a conveyance direction, wherein the pad has a recessed portion upstream from the fixing nip in the conveyance direction, the recessed portion extending in a longitudinal direction of the pad orthogonal to the conveyance direction, and wherein a distance from an entrance of the fixing nip to a downstream edge of the recessed portion in the conveyance direction is 0 mm or more and 10 mm or less, a width of the recessed portion in the conveyance direction is 3 mm or more, and a depth of the recessed portion is equal to or larger than a thickness of the slider.

2. The fixing device according to claim 1, wherein the recessed portion extends over an entire length of the fixing nip in the longitudinal direction.

3. The fixing device according to claim 1, wherein the pad has a contact surface contacting the slider, and the recessed portion is recessed from the contact surface in a direction away from the slider.

4. The fixing device according to claim 1, wherein the pad includes an attachment to fix the pad to the fixing device, and the attachment is outside the fixing nip in the longitudinal direction.

5. An image forming apparatus comprising the fixing device according to claim 1.

* * * * *